US00RE44754E

(19) United States
(12) Reissued Patent
Verna et al.

(10) Patent Number: US RE44,754 E
(45) Date of Reissued Patent: Feb. 11, 2014

(54) STACKABLE TRAY HAVING ANTI-PIVOT STOP AND WASH APERTURES

(75) Inventors: Donald Verna, Wixom, MI (US); Douglas T. Cox, Durand, MI (US); Douglas Hood, Forth Worth, TX (US)

(73) Assignee: Pinckney Molded Plastics, Inc., Howell, MI (US)

(21) Appl. No.: 11/508,114

(22) Filed: Aug. 22, 2006

Related U.S. Patent Documents

Reissue of:
(64) Patent No.: 6,886,710
Issued: May 3, 2005
Appl. No.: 10/174,698
Filed: Jun. 19, 2002

U.S. Applications:
(60) Provisional application No. 60/367,688, filed on Mar. 26, 2002.

(51) Int. Cl.
*B65D 21/032* (2006.01)

(52) U.S. Cl.
USPC ..... 206/507; 206/506; 206/505; 206/509

(58) Field of Classification Search
CPC ..... B65D 21/032
USPC ..... 206/503, 505, 506, 507, 509, 511, 515, 206/518, 519
See application file for complete search history.

(56) References Cited

U.S. PATENT DOCUMENTS

| | | | | |
|---|---|---|---|---|
| 3,398,840 A | | 8/1968 | Wilson | 211/126 |
| 3,404,804 A | | 10/1968 | Frater et al. | 220/97 |
| 3,405,810 A | | 10/1968 | Rogus | 211/126 |
| 3,613,943 A | * | 10/1971 | Bridenstine | 206/507 |
| 3,780,905 A | | 12/1973 | Herolzer | 220/97 |
| 3,865,239 A | | 2/1975 | Herolzer et al. | 206/507 |
| 3,917,108 A | | 11/1975 | Thurman | 220/66 |
| 3,934,724 A | | 1/1976 | Johnson | 206/507 |
| 4,000,817 A | | 1/1977 | Sanders et al. | 206/505 |
| 4,189,052 A | | 2/1980 | Carroll et al. | 206/507 |
| 4,211,327 A | | 7/1980 | Stahl et al. | 206/505 |
| D264,513 S | | 5/1982 | Miller | D34/43 |
| 4,457,433 A | | 7/1984 | Wilson | 206/505 |
| 4,466,541 A | | 8/1984 | Tabler et al. | 206/506 |
| 4,520,928 A | | 6/1985 | Wilson | 206/505 |
| 4,523,681 A | | 6/1985 | Kreeger | 206/507 |
| 4,577,759 A | | 3/1986 | Kreeger | 206/505 |

(Continued)

*Primary Examiner* — Stephen Castellano
(74) *Attorney, Agent, or Firm* — Ungaretti & Harris LLP

(57) ABSTRACT

A multi-purpose tray including a front, a back, a first side, a second side, and a bottom. The tray can include beams extending from the front of the tray and slots defined in the back of the tray. When two trays are stacked in opposite directions with respect to one another, the beams are received by the slots. The tray also includes a domed bottom. The domed bottom has a convex profile with respect to the interior of the tray and can include transverse ribs or longitudinal ribs. The tray also includes drain apertures positioned along the front and back of the tray. The drain apertures can enhance cleaning of the tray by communicating fluid from channels defined by the front and back. The tray also includes a stop for projection for limiting sliding movement of a top tray relative to a bottom tray when two trays are stacked in a similar orientation with respect to one another. The tray also includes handles in the first and second side and a gripping portion on one of the first and second handles.

33 Claims, 16 Drawing Sheets

(56) References Cited

U.S. PATENT DOCUMENTS

| | | | | | |
|---|---|---|---|---|---|
| 4,600,103 | A | | 7/1986 | Tabler | 206/505 |
| 4,842,142 | A | | 6/1989 | Kreeger | 206/505 |
| 4,905,833 | A | | 3/1990 | Kreeger et al. | 206/506 |
| 4,960,207 | A | | 10/1990 | Tabler et al. | 206/507 |
| 4,982,844 | A | * | 1/1991 | Madan et al. | 206/506 |
| 5,035,326 | A | | 7/1991 | Stahl | 206/507 |
| 5,287,966 | A | | 2/1994 | Stahl | 206/509 |
| 5,344,022 | A | | 9/1994 | Stahl | 206/507 |
| 5,372,257 | A | | 12/1994 | Beauchamp et al. | 206/504 |
| 5,582,296 | A | | 12/1996 | Beauchamp et al. | 206/503 |
| D401,066 | S | | 11/1998 | Ackermann | D3/307 |
| 5,881,902 | A | | 3/1999 | Ackermann | 206/509 |
| 5,913,424 | A | | 6/1999 | Kelly et al. | 206/509 |
| 5,960,720 | A | | 10/1999 | Borland et al. | 108/53.1 |
| 5,984,133 | A | | 11/1999 | Schutz | 220/601 |
| 6,241,096 | B1 | | 6/2001 | Littlejohn et al. | 206/515 |
| 6,260,706 | B1 | | 7/2001 | Koefelda | 206/505 |
| 6,273,259 | B1 | | 8/2001 | Stahl | 206/511 |
| 6,386,388 | B1 | | 5/2002 | Overholt | 220/608 |

* cited by examiner

STACKABLE TRAY HAVING ANTI-PIVOT STOP AND WASH APERTURES

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of the Provisional Patent Application No. 60/367,688 for a STACKABLE TRAY HAVING AN ANTI-PIVOT STOP AND WASH APERTURES, filed on Mar. 26, 2002. This claim is made under 35 U.S.C. § 119(e) and 37 C.F.R. § 1.53(c)(3).

FIELD OF THE INVENTION

This invention generally relates to multi-purpose reusable load-bearing trays and, more specifically, to trays adapted to be nestable or stackable in three positions.

BACKGROUND OF THE INVENTION

Plastic trays that are stackable and/or nestable can be desirable to maintain cargo such as material and/or products. However, existing trays are not as efficient as desired. Specifically, existing trays can require excessive handling time and cleaning time. Also, the existing trays may not nest together as well as desired. An improved tray is needed.

SUMMARY OF THE INVENTION

The present invention provides an improved tray for maintaining cargo during transport. The tray of the present invention can include one or more drain apertures disposed along a front or back of the tray. The drain aperture can improve the efficiency of the tray by improving the cleaning of the tray. In particular, the structure of the existing trays can define blind holes and pockets in which debris and/or vermin can accumulate. Positioning a drain aperture adjacent the blind holes or pockets of the tray can enhance the likelihood that the debris can be quickly removed during cleaning. The drain aperture can be disposed along any surface of the front or back of the tray and can be defined, at least in part, by ribs disposed between a wall and an apron of the front or back of the tray. The ribs can be any shape as desired, including arcuate, straight, cross-shaped, or T-shaped. A drain aperture can also be formed in a notch defined in the front or back of the tray; the notch being used for aligning two trays during stacking.

The present invention also provides a tray with a domed bottom. The bottom of the tray can be convex with respect to the interior of the tray. The domed shape of the bottom of the tray can enhance the strength of the tray. The bottom can also include at least one transverse and/or at least one longitudinal rib to enhance the strength of the bottom. The bottom can be formed with a convex or concave profile.

The present invention also provides a tray with two handles where one of the handles includes a gripping portion. By disposing a gripping portion on only one of the handles, a user of the tray can quickly identify the orientation of the tray. The efficiency of the tray is enhanced when a user can quickly identify the orientation of the tray during stacking the of trays.

The present invention also provides ribs disposed in a pocket of a bottom tray for receiving and engaging feet of a top tray. The ribs can enhance the alignment of two trays stacked relative to each other and support a top tray during sliding movement relative to a bottom tray. A rib closest to the center of the tray can be tapered to reduce the likelihood that a top tray will bind relative to a bottom tray when the two trays are being engaged.

The present invention also provides a stop having a ramp shape positionable in a channel of the tray. When a top tray is engaged with a bottom tray, the top tray is slidingly received by a channel of the bottom tray. The stop disposed in the channel can limit the movement of the top tray relative to the bottom tray when the trays are being engaged with respect to one another. A ramped portion of the stop can enhance the efficiency of the tray by ensuring that sliding movement of the trays will only be prevented in only one direction.

The present invention also provides a tray having beams disposed on a front of the tray and corresponding slots formed in the rear of the tray. The corresponding beams and slots can permit two trays to be stacked on top of one another when in a similar orientation. The support of the top tray relative to the bottom tray, when two trays are stacked in similar orientation, does not occur at the outermost edges of the front corners of the trays. The beams can be received by the slots when two trays are stacked in an opposite direction relative to one another.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Various embodiments of the present invention are shown throughout the figures. These figures include common elements in different structural configurations. Common elements are designated with a common base numeral and differentiated with a alphabetic designation.

Figure 1:
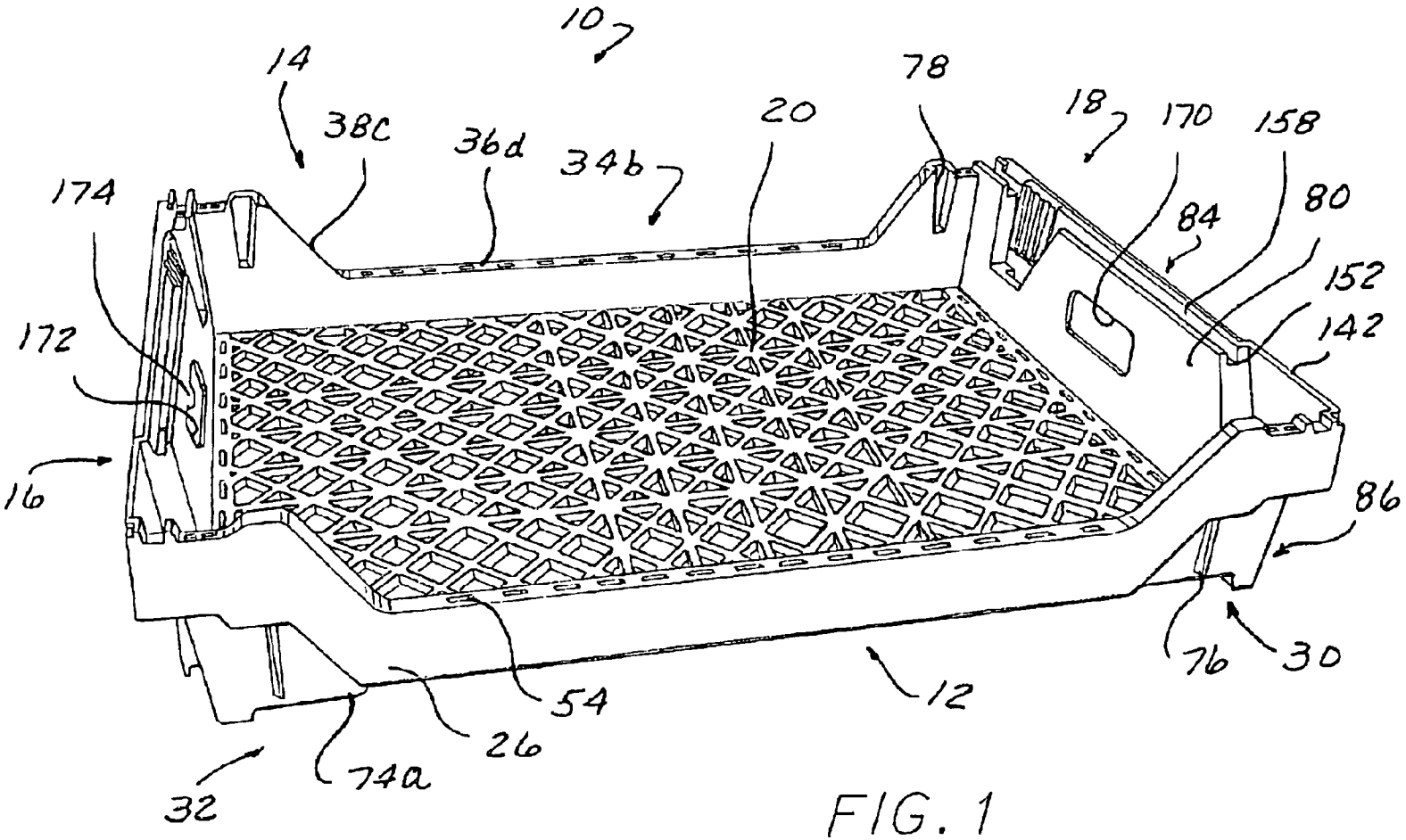
FIG. 1 is a perspective view of a tray according to a first embodiment of the invention.
Figure 15:
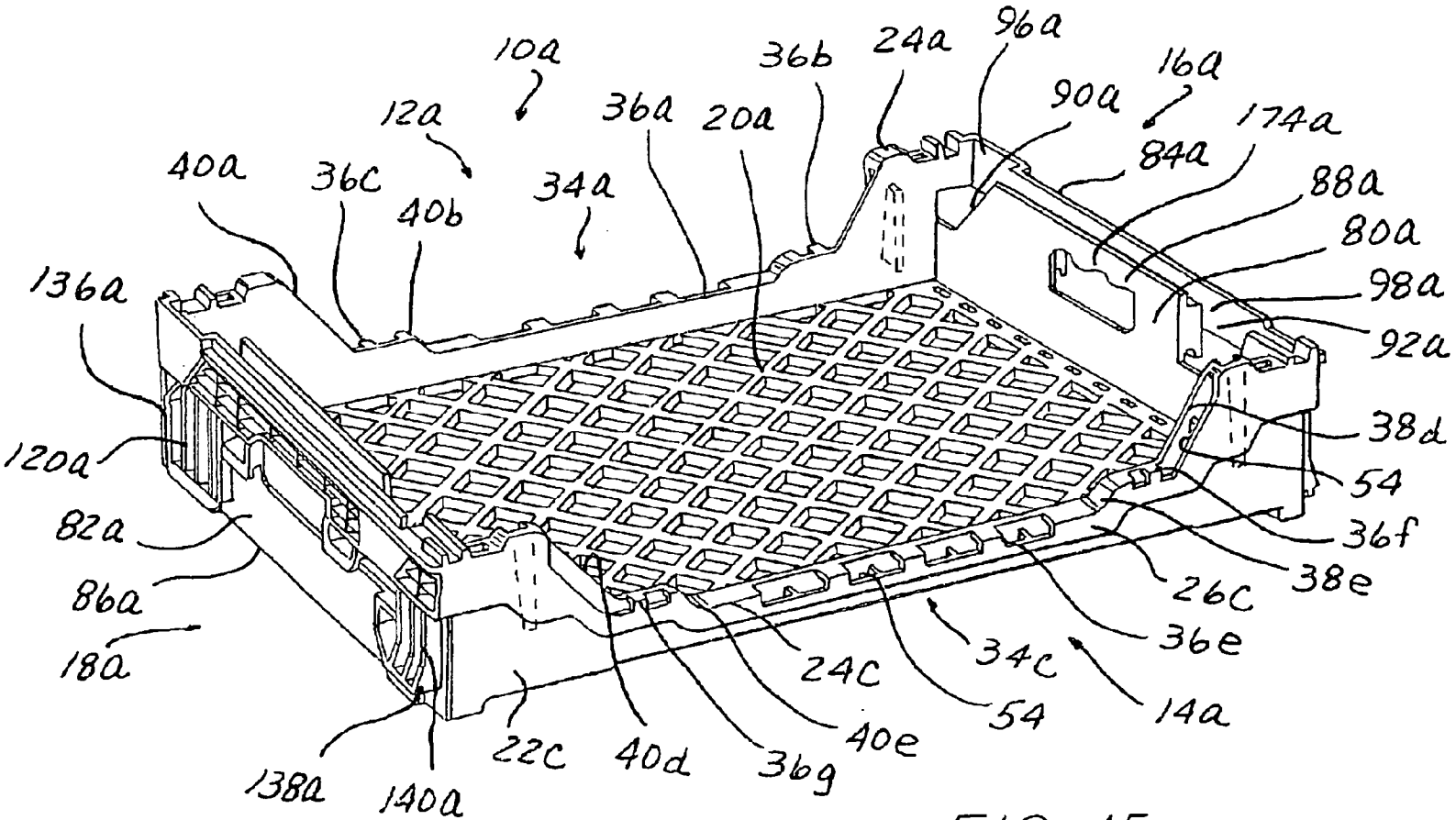
FIG. 15 is a perspective view of a tray according to a second embodiment of the invention.

Referring now to FIG. 1, the present invention provides a multipurpose tray 10. The tray 10 can include a front 12, a rear 14, a first side 16, a second side 18, and a bottom 20 which can be integrally formed with respect to one another. The tray 10 can be fabricated from plastic in an injection molding process. FIG. 15 shows another embodiment of the invention, a tray 10a having a front 12a, a rear 14a, a first side 16a, a second side 18a, and a bottom 20a which can be integrally formed with respect to one another.

Figure 2:
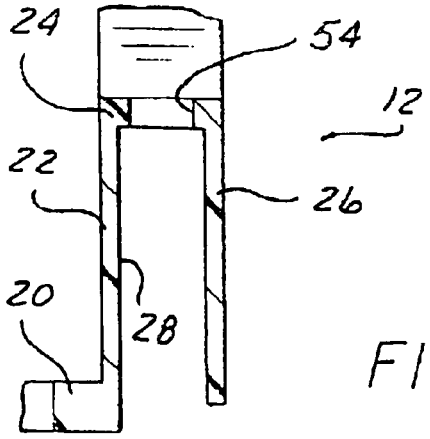
FIG. 2 is a cross-sectional view of a front of the tray according to the first embodiment of the invention.
Figure 10:
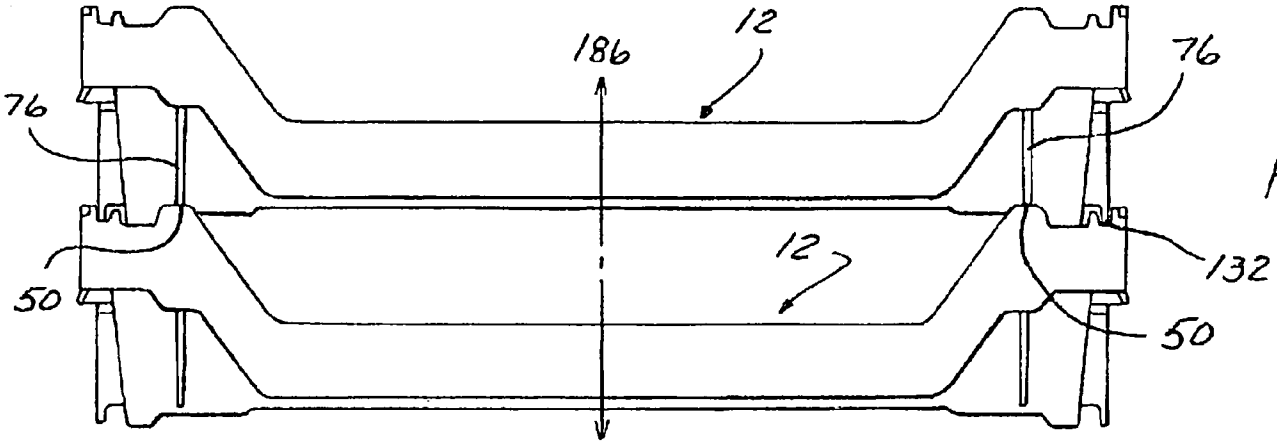
FIG. 10 is a front plan view of two trays according to the first embodiment of the invention stacked in a similar orientation with respect to one another.

Referring now to FIGS. 1 and 2, the front 12 can extend from the first side 16 to the second side 18 and can include a wall 22, a fillet 24 and an apron 26. The wall 22, fillet 24 and apron 26 can define a channel 28. The front 12 can also include a right-hand portion 30 and a left-hand portion 32 which are mirror images of one another with respect to a substantially vertical center axis 186 of the front 12, as best seen in FIG. 10.

Figure 3:
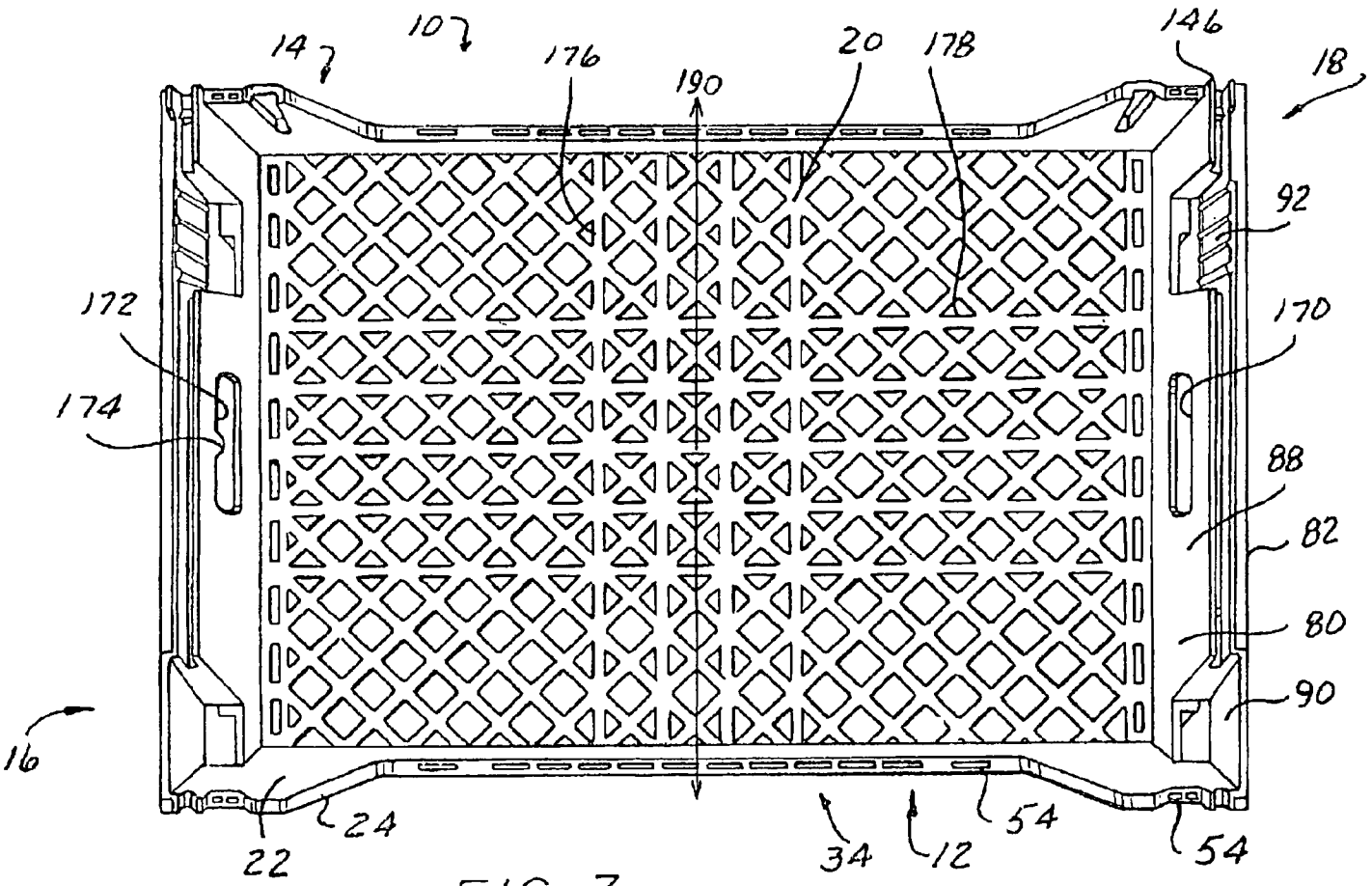
FIG. 3 is a top plan view of the tray according to the first embodiment of the invention.

Referring now to FIG. 3, the fillet 24 can define an opening 34. The opening 34 can be centered along the axis 186 of the front 12 with respect to the right-hand portion 30 and the left-hand portion 32. The opening 34 can include a bottom surface 36 and side surfaces 38 and 40. In a second embodiment of the invention, an opening 34a is shown in perspective view in FIG. 15, in partial detailed cross-sectional view in FIG. 16, and in overhead plan view in FIG. 17. The opening 34a can be defined by a fillet 24a of a front 12a of tray 10a. The opening 34a can include bottom surface 36a, side surfaces 38a and 40a as well as secondary bottom surfaces 36b and 36c and secondary side surfaces 38b and 40b.

Figure 5:
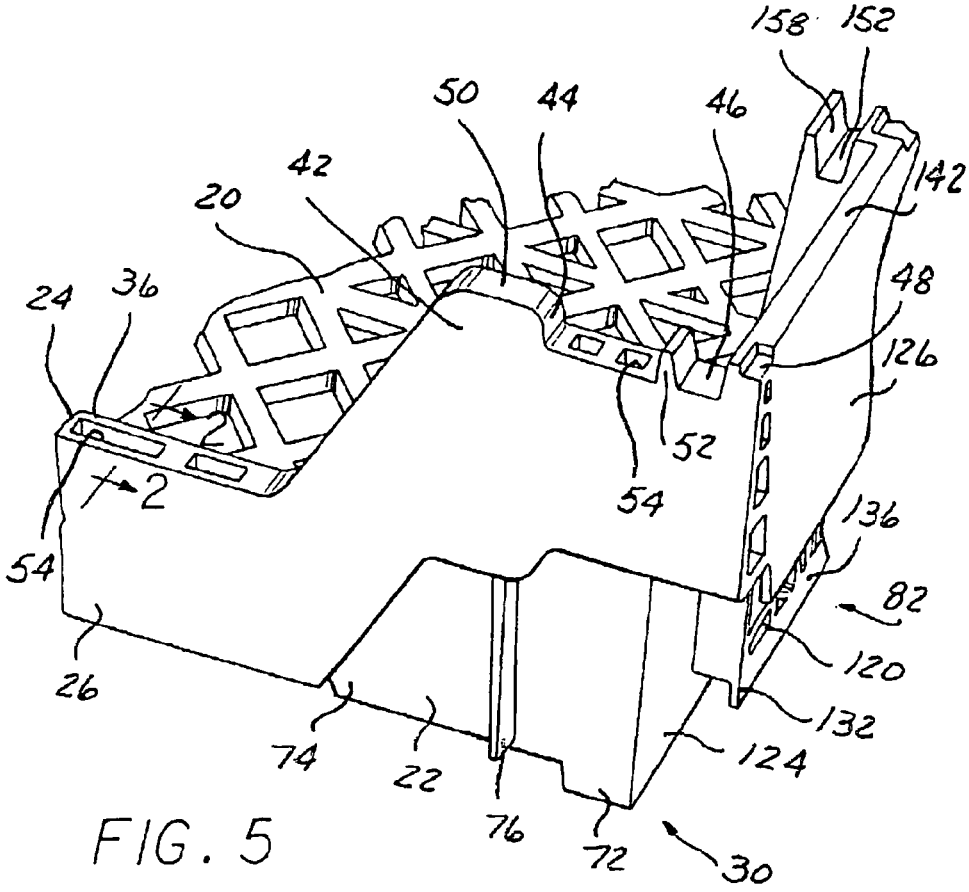
FIG. 5 is a detailed partial perspective view of a front corner of the tray according to the first embodiment of the invention.

Referring now to FIG. 5, the fillet 24 can also define a boss 42, a notch 44, a gain 46, and a dimple 48. The boss 42 is positioned along the length of the front 12 between the opening 34 and the notch 44. The boss 42 includes a support surface 50. A projection 52 can extend from the fillet 24 between the notch 44 and the gain 46. The dimple 48 can be positioned at an outermost edge of the front 12. An alternative embodiment of the dimple 48a is shown extending a height of an apron 26a of the tray 10a in FIGS. 17, 18 and 20.

Referring now to FIGS. 1-5, fillet 24 can be pierced by one or more apertures 54. A plurality of apertures 54 can be evenly spaced along the length of the front 12. The apertures 54 can be formed in the bottom surface 36 of the opening 34, the side surfaces 38 and 40 of the opening 34, or in the notch 44. The apertures 54 can enhance cleaning of the tray 10 by reducing the likelihood that vermin or debris will become trapped in the channel 28.

Figure 4:
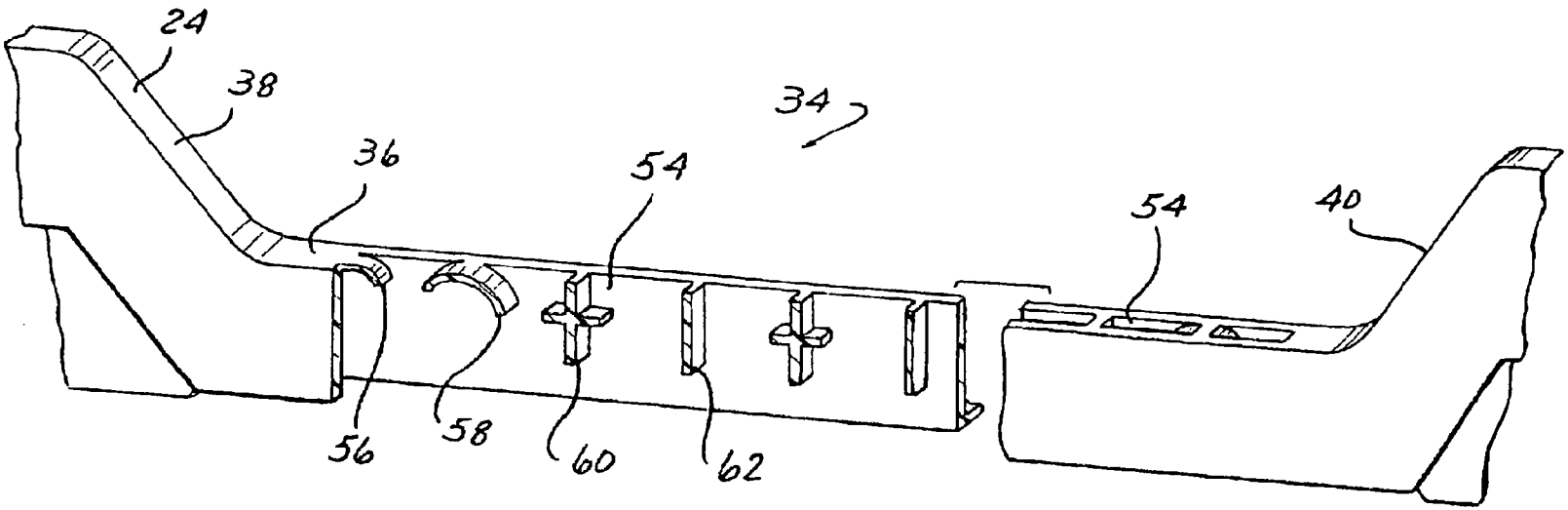
FIG. 4 is a partial cross-sectional and perspective view of the tray according to the first embodiment of the invention showing the configuration of ribs between the wall and the apron.
Figure 16:
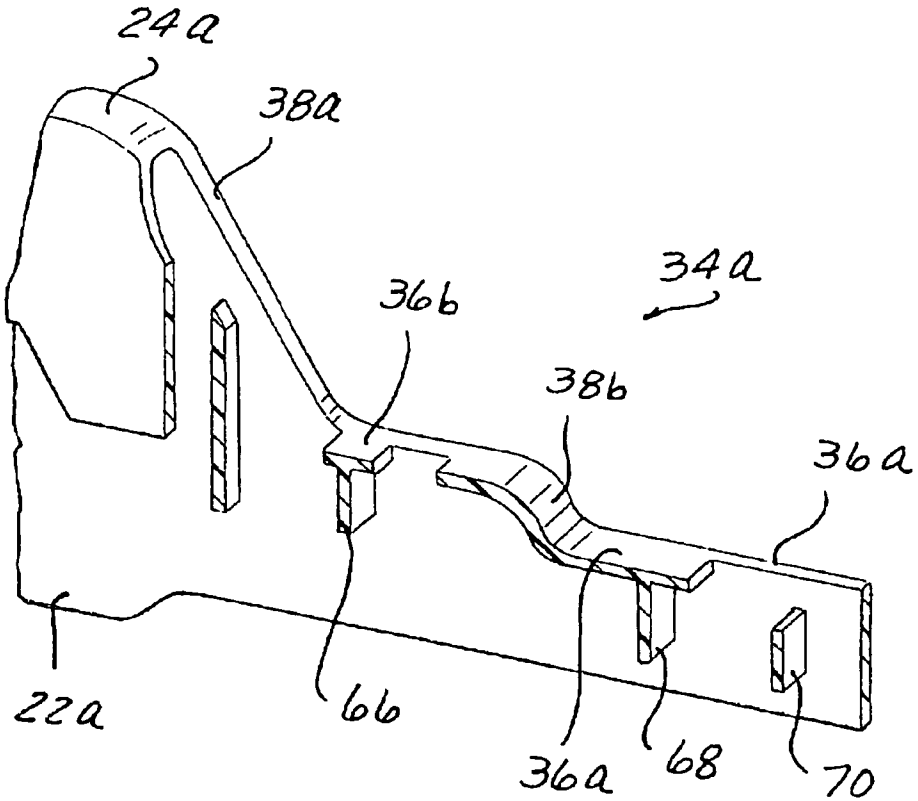
FIG. 16 is a detailed partial cross-sectional view of a front of the tray according to the second embodiment of the invention showing the ribs.

Referring now to FIG. 4, ribs can be disposed in the channel 28 to define a plurality of apertures and to enhance the structural integrity of the tray 10. Referring to FIG. 5, ribs 56, 58, 60 and 62 can be formed in various shapes and be disposed at various positions relative to the opening 34. As shown in FIG. 16, ribs 64, 66, 68 and 70 can be positioned adjacent a side surface 38a, a secondary bottom surface 36b and a bottom surface 36a or any combination thereof.

Figure 18:
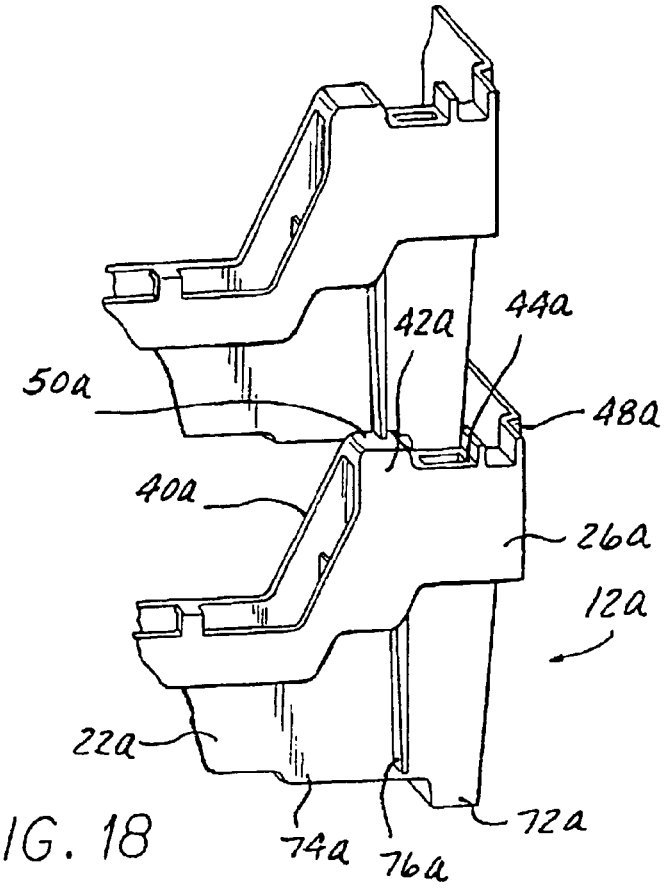
FIG. 18 is a partial detailed view of the front corners of two trays according to the second embodiment of the invention.

Referring now to FIG. 5, the front 12 also includes a wall 22. The wall 22 can define a foot 72 and shoulder 74. The foot 72 can be shaped to correspond to the shape of the notch 44. Also, the foot 72 is substantially vertically aligned with the notch 44. The shoulder 74 will be described in greater detail below. FIG. 18 shows a front wall 12a of a tray 10a having wall 22a that defines a foot 72a and shoulder 74a. The foot 72a is shaped to correspond to the shape of the notch 44a and is substantially vertically aligned with the notch 44a.

Referring again to FIG. 5, a beam 76 extends from wall 22 generally toward the apron 26. The beam 76 does not extend past the apron 26. The beam 76 can be tapered such that the beam 76 is narrowest immediately adjacent the foot 72. The beam 76 is substantially vertically aligned with the support surface 50. FIG. 18 shows a front 12a having a beam 76a substantially vertically aligned with the support surface 50a of a boss 42a.

Figure 7:
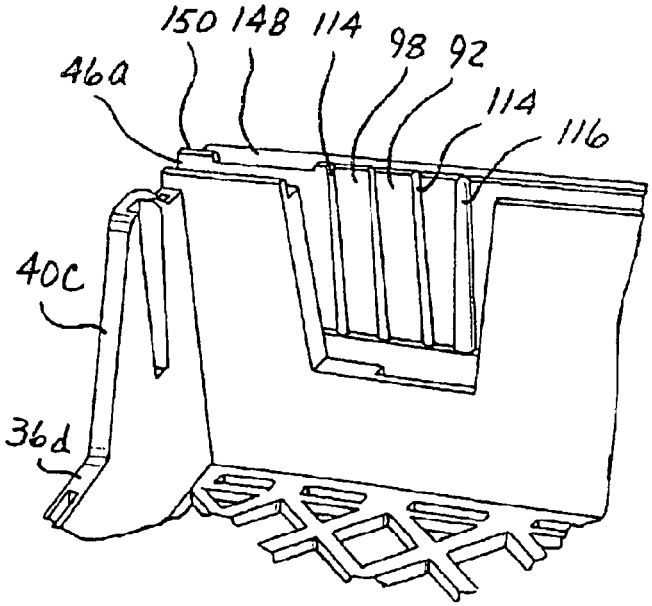
FIG. 7 is partial detailed perspective view of the rear corner of the tray according to the first embodiment of the invention.
Figure 8:
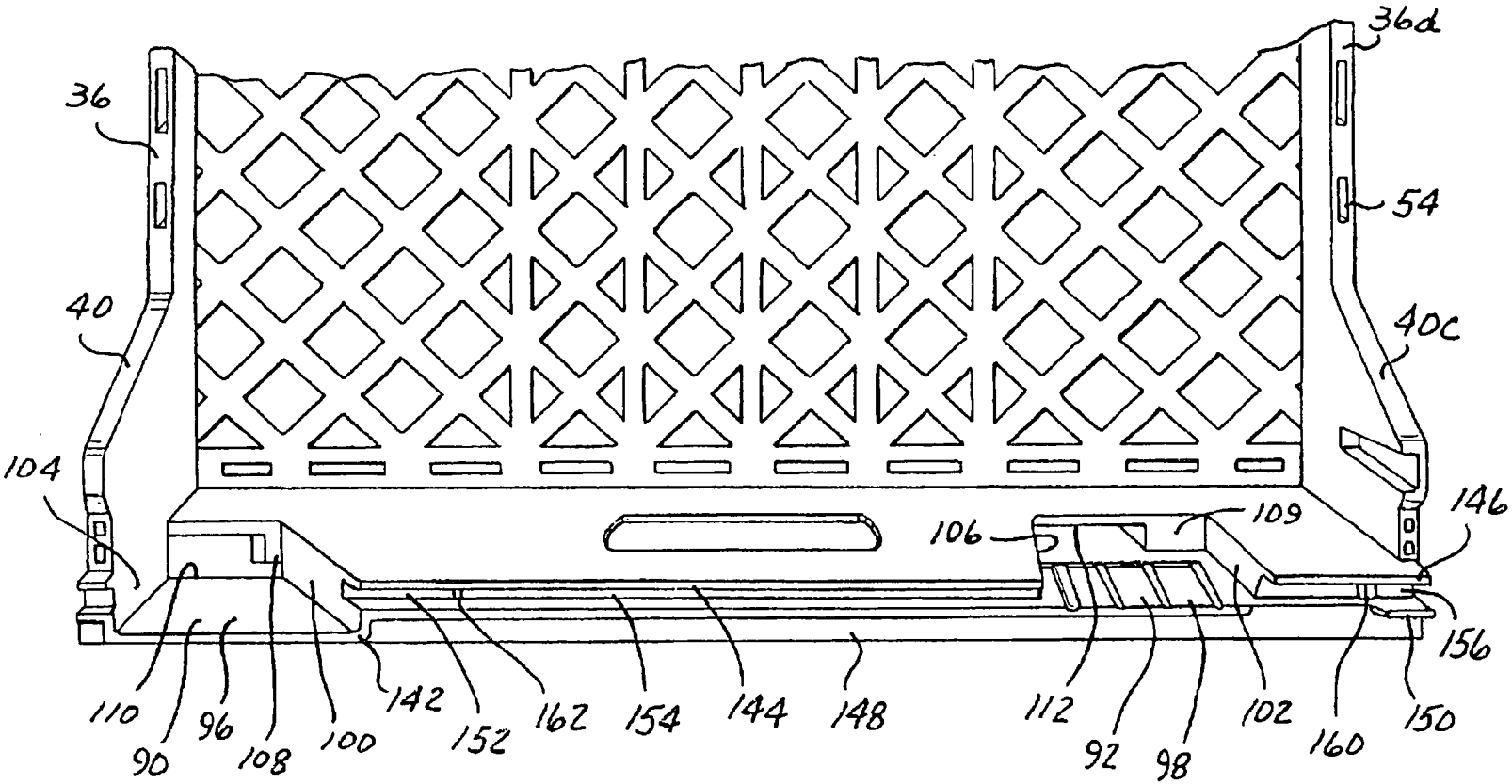
FIG. 8 is a detailed top plan view of a second side of the tray according to the first embodiment of the invention.
Figure 9:
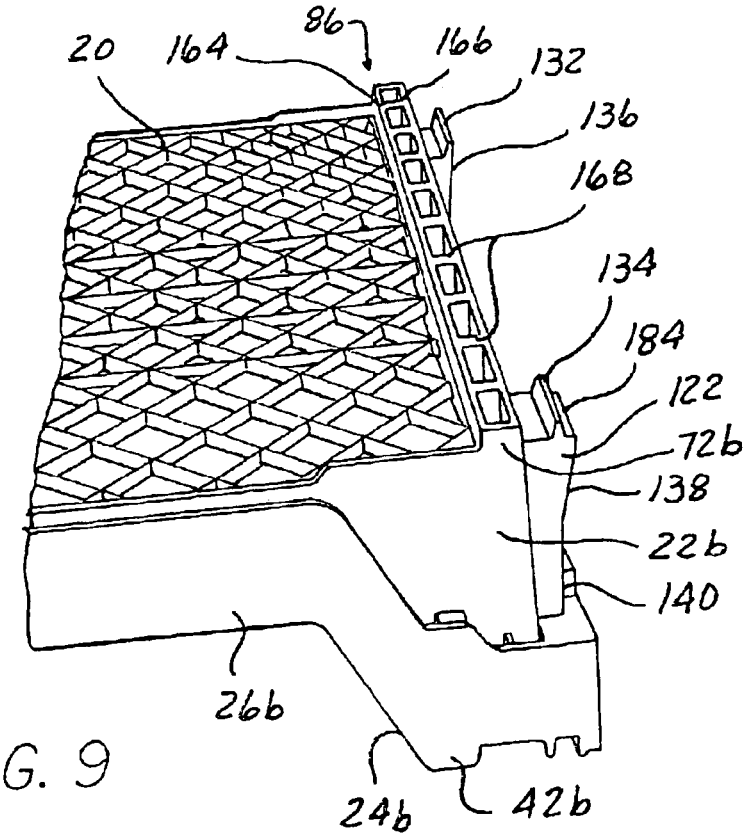
FIG. 9 is a detailed perspective view of a rear corner of a tray according to the first embodiment of the invention.

Referring now to FIGS. 1 and 6-9, the rear 14 of the tray 10 can be substantially similar to the front 12 of the tray 10. The rear 14 can include a wall 22b, a fillet 24b, and an apron 26b. The fillet 24b can define an opening 34b, including bottom surface 36d and side surfaces 38c and 40c, and a boss 42b. One or more apertures 54 can pierce the fillet 24b along the surface 36d, or a notch 44b. The rear 14 also includes a slot 78. The slot 78 extends vertically downward from the boss 42b along the wall 22b. The slot 78 can be tapered to be narrowest at a position furthest from the boss 42b. The slot 78 is substantially aligned with the beam 76 of the front 12 to receive a beam 76 when two trays 10 are stacked 180° relative to another. The stacking of two trays relative to one another will be described in greater detail below. The rear 14 does not include beams extending from the wall 22b as best seen in FIG. 9. Also, the rear 14 may not include a dimple 28 as formed in the front 12.

Figure 19:
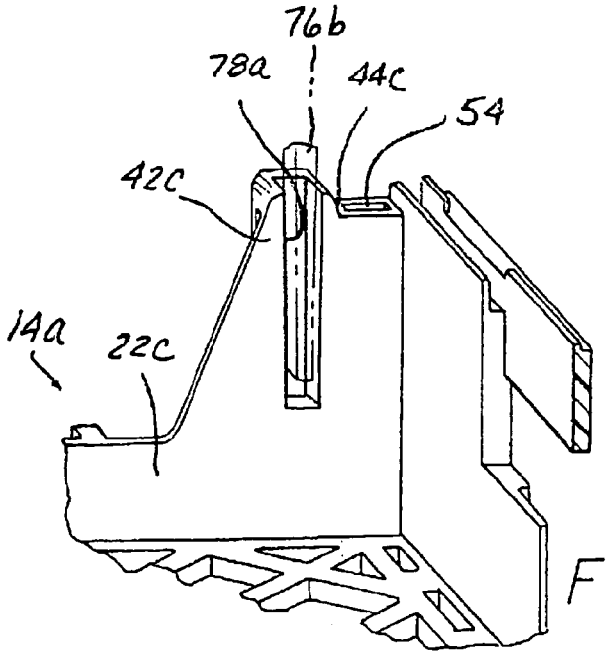
FIG. 19 is a partial detailed view of a rear corner of the tray according to the second embodiment of the invention.

FIGS. 15 and 19 show the rear 14a of alternative embodiment of the invention. The rear 14a can be substantially similar to the front 12a of the tray 10a. The rear 14a can include a wall 22c, a fillet 24c, and an apron 26c. The fillet 24c can define an opening 34c, including bottom surfaces 36e, 36f and 36g as well as side surfaces 38d, 38e and 40d, 40e and a boss 42c. One or more apertures 54 can pierce the fillet 24c along the surfaces 36e, 36f, 36g, 38d, 38e, 40d and 40e, or a notch 44c. The rear 14a also includes a slot 78a. The slot 78a extends vertically downward from the boss 42c along the wall 22c. The slot 78a can be tapered to be narrowest at a position furthest from the boss 42c. The slot 78a is substantially aligned with the beam 76a of the front 12a to receive a beam 76a when two trays 10a are stacked 180° relative to another. The stacking of two trays relative to one another will be described in greater detail below. The rear 14a does not include beams extending from the wall 22c as best seen in FIG. 15. Also, the rear 14a may not include a dimple 28a as formed in the front 12a.

Referring now to FIGS. 1, 3, 5 and 8, the second side 18 can include an inner face 80, an outer face 82, a top portion 84 and a bottom portion 86. The inner face 80 can be defined by an innermost surface 88, a front pocket 90 and a rear pocket 92. The front and rear pockets 90 and 92 can be defined by inwardly facing surfaces 96 and 98, front facing surfaces 100 and 102, rear facing surfaces 104 and 106, and upper facing surfaces 108 and 109, respectively. The inwardly facing surfaces, the front facing surfaces, the rear facing surfaces and the upper facing surfaces of each pocket define openings 110 and 112 in the front and rear pockets 90 and 92. The pockets 90 and 92 are shaped to substantially correspond to the shape of mating feet disposed on the outer face 82 of the second side 18. The feet will be described in greater detail below.

Figure 6:
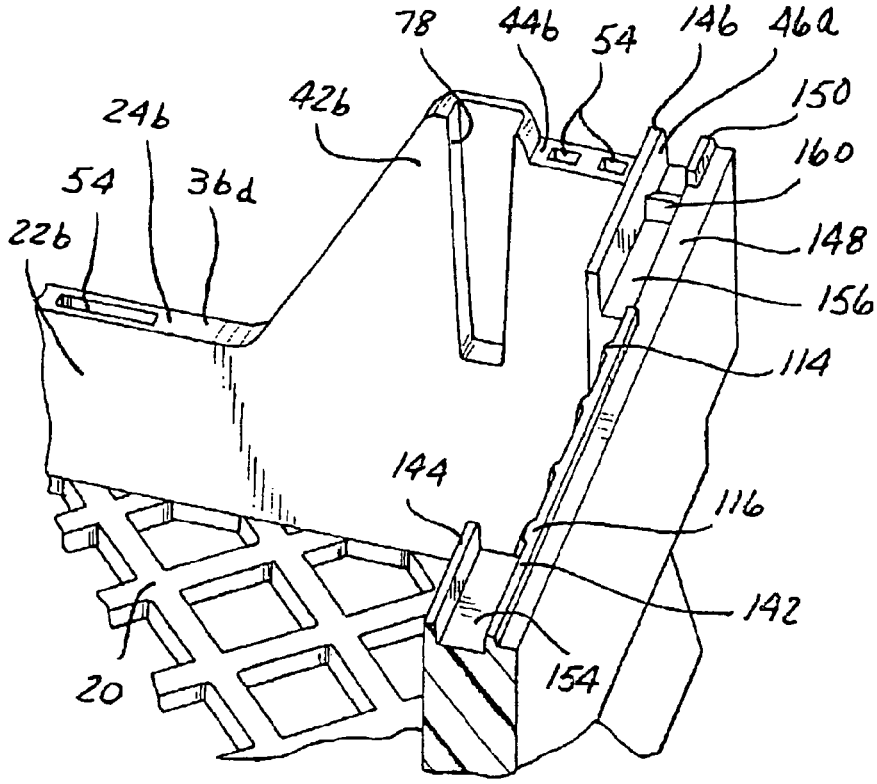
FIG. 6 is a partial detailed perspective view of a rear corner of the tray according to the first embodiment of the invention.

Referring now to FIGS. 6 and 7, one or more ribs 114 can be disposed on the inwardly facing surface 98 of the rear pocket 92. The ribs 114 are generally arcuate or semi-circular in cross section. A rib 116 positioned closest to the center of the second side 18 can be tapered, such that a radius of the rib 116 is greater than a radius of the ribs 114. The rib 116 and ribs 114 can project from the surface 98 the same distance. Tapering the rib 116 and enhances the sliding interaction between two trays 10 to be stacked relative to one another. Specifically, it has been found that when the rib 116 is shaped without a tapered semi-circular cross section, a top tray sliding relative to a bottom tray can bind.

Referring now to FIGS. 5, 9 and 1, the outer face 82 of the second side 18 can include a honeycomb section 118, a front foot 120 and a rear foot 122, and an outwardly facing surface 124. The honeycomb section 118 can be disposed adjacent to the top portion 84 of the second side 18. The honeycomb section 118 enhances the strength and rigidity of the tray 10. Opposite of the front pocket 90 of the inner face 80 a planar surface 126 is disposed on the outer face 82. Numerical and alphabetic information can be molded or formed on the surface 126. Runners 128 and 130 extend downwardly toward the bottom portion 86 from the honeycomb section 118.

Referring now to FIGS. 5 and 9, the front foot 120 and a rear foot 122 extend from the outwardly facing surface 124 of the outer face 82. The feet 120 and 122 include runners 132 and 134 respectively. The feet 120 and 122 can be honeycombed. The front foot 120 is shaped to correspond to the shape of the rear pocket 92. The rear foot 122 is shaped to correspond to the shape of the front pocket 90. The front foot 120 can be defined in part by an outer surface or plane 136, best seen in FIG. 5. The rear foot 122 can be defined by two outer surfaces or planes 138 and 140. The surfaces 138 and 140 are disposed at an angle of greater than 0° relative to one another.

Referring now to FIGS. 1, 5 and 8, the top portion 84 of the second side 18 is defined by a plurality of upper facing surfaces 142, 144, 146, 148, 150, 152, 154, and 156. Surfaces 144 and 148 are downwardly recessed with respect to surface 142. Surfaces 142, 146 and 150 are substantially co-planar. Surfaces 152, 154 and 156 define the bottom surface of a discontinuous channel 158 extending along the top portion 84 of the second side 18 between the front 12 and the rear 14. The channel 158 is longitudinally aligned with the gain 46 of the front 12 and a gain 46a of the rear 14. A stop 160 is disposed in the channel 158. The stop 160 can be shaped like a ramp with a substantially vertical side facing toward the front 12 and a substantially ramped side facing the rear 14. The stop 160 can prevent movement of a top tray relative to a bottom tray when two trays are to be stacked in a similar orientation and slidingly engaged in a first direction as will be discussed in greater detail below. The first direction is defined when the front of a top tray is engages the rear of the bottom tray at the beginning of the sliding engagement. The second direction is defined when the rear of the top tray is received by front of the bottom tray during the beginning of the sliding engagement. Surface 152 is downwardly recessed with respect to surface 154 and a rounded shoulder 162 can be defined therebetween.

Referring now to FIG. 9, the bottom portion 86 of the second side 18 includes two longitudinal rails 164 and 166 that extend between opposite edges of the foot 72 of the front 12 to a foot 72b of the rear 14. Transverse rails 168 can be randomly or evenly spaced between the rails 164 and 166 along the length of the second side 18.

Referring now to FIGS. 1 and 3, the first side 16 and the second side 18 are substantially mirror images of one another with respect to a longitudinal axis 190. However, the sides 16 and 18 are different in that a configuration of a handle 170 of the second section 18 is different than a configuration of a handle 172 of the first section 16. Specifically, one of the handles 170 and 172 includes a gripping portion 174. The gripping portion includes one or more rounded projections extending into a cavity defined by the handle. FIGS. 1 and 3 illustrate a gripping portion 174 having one rounded projection extending from handle portion 172. However, the gripping portion can extend from the handle portion 170 and can include more than one rounded projection. FIG. 15 illustrates a gripping portion 174a including a plurality of rounded projections.

Referring to FIGS. 1, 3 and 15, the gripping portions 174 and 174a generally conform to the hand of a user of the tray 10 or tray 10a. The gripping portion 174 can be advantageous to indicate to a human handler the orientation of the tray. For example, if the trays are to be stacked at 180° relative to one another, the human handler can grasp a tray to be stacked and recognize whether the tray can be placed on top of a stack of trays or must be oriented differently before the tray is stacked by feeling the gripping portion instead of having to examine the sides of the tray to identify the location of the beam 76 of the tray being held and the slot 78 of the tray at the top of the stack of trays. Specifically, when trays are to be stacked at 180° relative to one another, the human handler will recognize that every other tray must be grasped so that the gripping portion is felt with a particular hand. When the trays are to be stacked at 0° relative to one another, the human handler will recognize that every tray must be grasped so that the gripping portion is felt with a particular hand.

Figure 17:
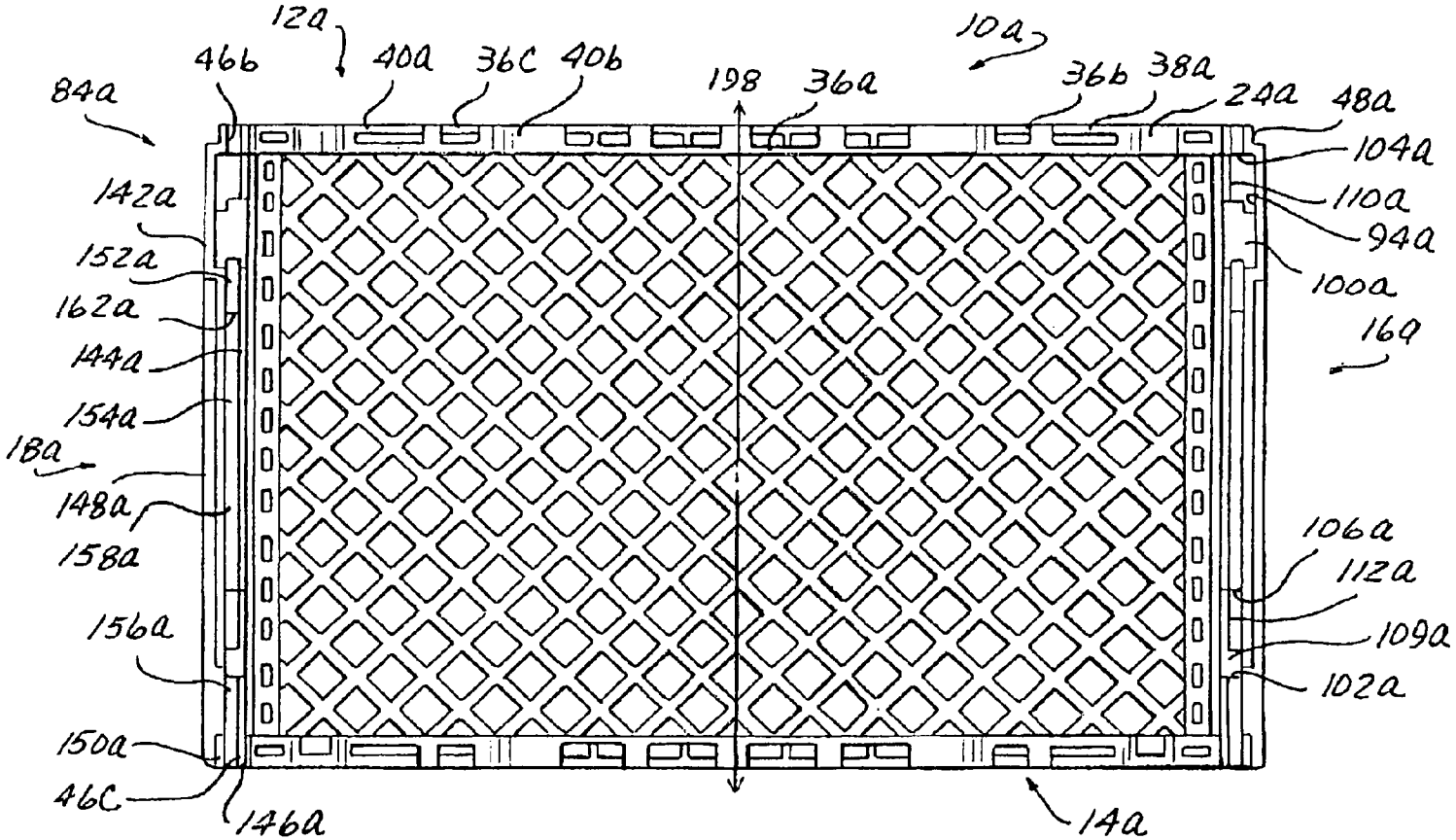
FIG. 17 is a top plan view of the tray according to the second embodiment of the invention.
Figure 22:
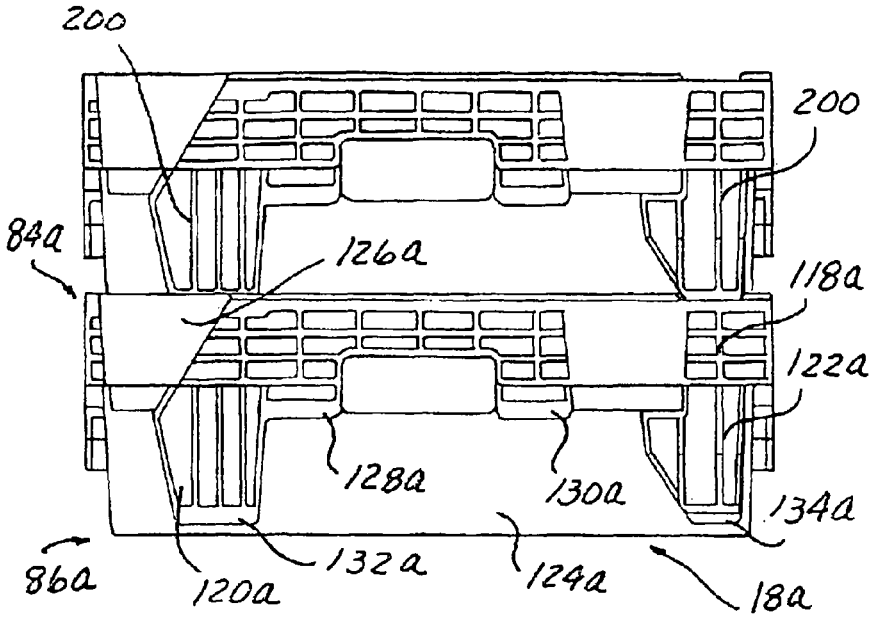
FIG. 22 is a side plan view of two trays according to the second embodiment of the invention stacked in a similar orientation with respect to one another.
Figure 23:
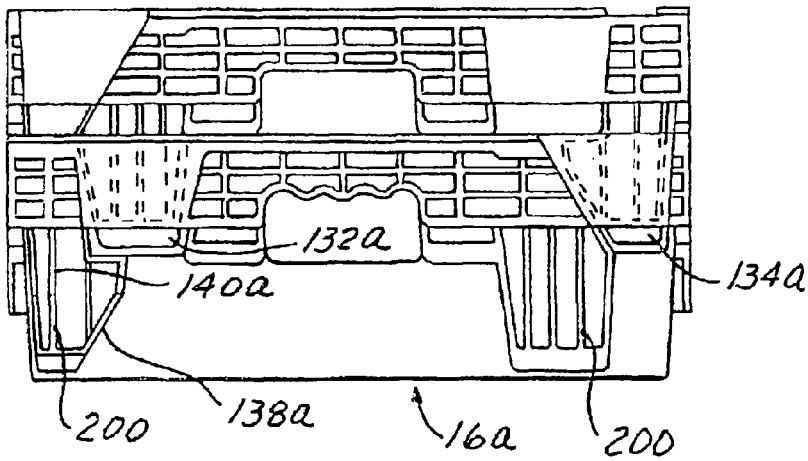
FIG. 23 is a side plan view of two trays according to the second embodiment of the invention stacked at an angle of 180° relative to one another.

Referring now to FIGS. 15, 17 and 22, the first side 16a and second side 18a of the tray 10a according to an alternative embodiment of the invention can be substantially similar to the first side 16 and second side 18 of the tray 10, respectively. The first side 16a and second side 18a can be mirror images of one another about a longitudinal axis 198. Each side can include an inner face 80a, an outer face 82a, a top portion 84a and a bottom portion 86a. The inner face 80a can be defined by an innermost surface 88a, a front pocket 90a and a rear pocket 92a. The front and rear pockets 90a and 92a can be defined by inwardly facing surfaces 96a and 98a, front facing surfaces 100a and 102a, and rear facing surfaces 104a and 106a, respectively. The rear pocket 92a can include an upper facing surface 109a. The inwardly facing surfaces, the front facing surfaces, the rear facing surfaces and the upper facing surfaces of each pocket define openings 110a and 112a in the front and rear pockets 90a and 92a. The pockets 90a and 92a are shaped to substantially correspond to the shape of mating feet disposed on the outer face 82a. The feet will be described in greater detail below.

Referring now to FIG. 22, the outer face 82a can include a honeycomb section 118a, a front foot 120a and a rear foot 122a, and an outwardly facing surface 124a. The honeycomb section 118a can be disposed adjacent to the top portion 84a of the second side 18a. The honeycomb section 118a enhances the strength and rigidity of the tray 10a. Opposite of the front pocket 90a of the inner face 80a a planar surface 126a is disposed on the outer face 82a. Numerical and alphabetic information can be molded or formed on the surface 126a. Runners 128a and 130a extend downwardly toward the bottom portion 86a from the honeycomb section 118a.

Figure 24:
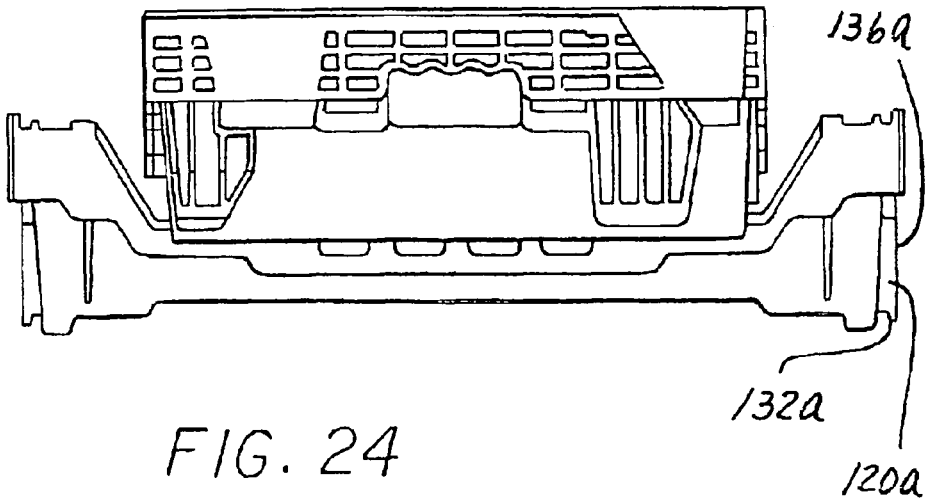
FIG. 24 is a front plan view of two trays according to the second embodiment of the invention stacked at an angle of 90° relative to one another.
Figure 25:
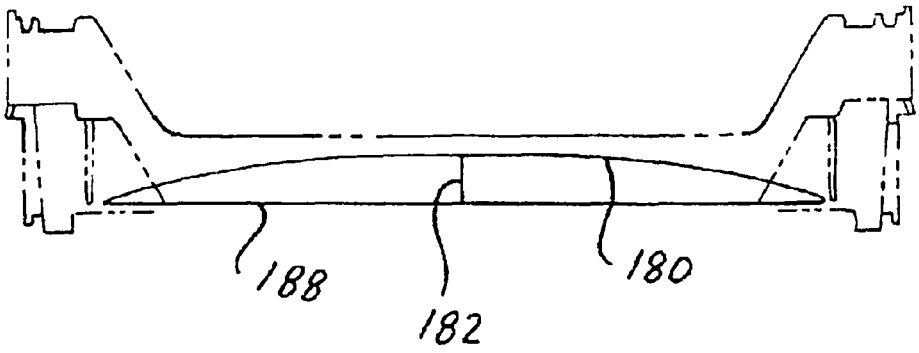
FIG. 25 is a schematic view of a tray according to the invention having a domed bottom.

Referring now to FIGS. 15 and 24, the front foot 120a and a rear foot 122a extend from the outwardly facing surface 124a of the outer face 82a. The feet 120a and 122a include runners 132a and 134a respectively. The feet 120a and 122a can include ribs 200. The front foot 120a is shaped to correspond to the shape of the rear pocket 92a. The rear foot 122a is shaped to correspond to the shape of the front pocket 90a. The front foot 120a can be defined in part by an outer surface or plane 136a. The rear foot 122a can be defined by two outer surfaces or planes 138a and 140a. The surfaces 138a and 140a are disposed at an angle of greater than 0° relative to one another.

Referring now to FIG. 17, the top portion 84a is defined by a plurality of upper facing surfaces 142a, 144a, 146a, 148a, 150a, 152a, 154a, and 156a. Surfaces 144a and 148a are downwardly recessed with respect to surface 142a. Surfaces 142a, 146a and 150a are substantially co-planar. Surfaces 152a, 154a and 156a define the bottom surface of a discontinuous channel 158a extending along the top portion 84a between the front 12a and the rear 14a. The channel 158a is longitudinally aligned with the gain 46b of the front 12a and a gain 46c of the rear 14a. Surface 152a is downwardly recessed with respect to surface 154a and a shoulder 162a can be defined therebetween.

Figure 20:
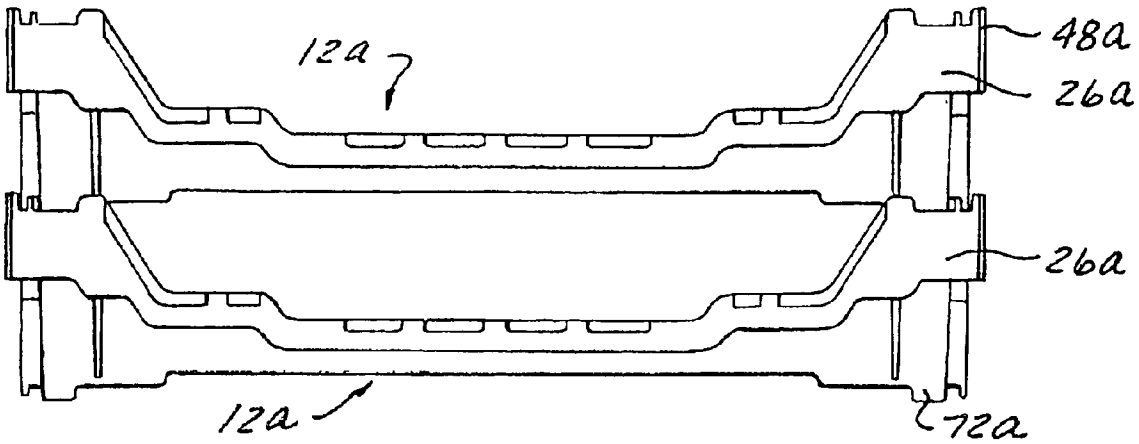
FIG. 20 is a front plan view of two trays according to the second embodiment of the invention stacked in a similar orientation with respect to one another.
Figure 21:
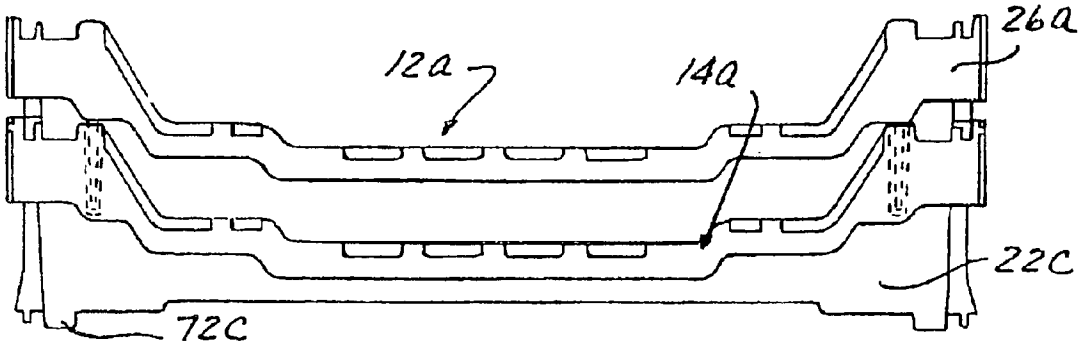
FIG. 21 is a plan view of two trays according to the second embodiment stacked at an angle of 180° relative to one another.

Referring now to FIGS. 15, 20 and 21, the bottom portion 86a of each side of the tray 10a can be substantially similar to the bottom portion of each side of the tray 10. Specifically, each bottom portion of the first and second sides 16a and 18a can include two longitudinal rails that extend between opposite edges of the foot 72a of the front 12a to a foot 72c of the rear 14a. Transverse rails can be randomly or evenly spaced between the longitudinal rails along the length of the first and second sides 16a and 18a.

Referring now to FIGS. 1, 3, 8 and 25, a bottom 20 of the tray 10 can define a lattice pattern. The bottom 20 can also include longitudinal ribs 176 and transverse ribs 178. The bottom 20 can also be domed to increase the strength of the tray 10 and reduce the material required to form the bottom 20. The bottom 20a of tray 10a can be domed. The shape of a domed bottom surface is shown schematically in FIG. 25. The front and sides of the tray are shown in phantom and a line 180 illustrates a profile of the bottom 20 along the transverse direction. Line 182 illustrates that the bottom can also be arched along the longitudinal direction. Line 188 illustrates a profile of a bottom that is not domed. The dome configuration of a bottom can increase the strength of the bottom by fifty percent. Tray 10a can include a domed bottom 20a. The enhanced strength of a domed-shaped bottom 20 can also reduce the amount of material necessary to form the bottom 20 when a predetermined strength is required.

Preferably, the dome is three-eights (⅜) of one inch at the center of the bottom 20. In other words, the center of the dome extends toward the interior of the tray 10 three-eights (⅜) of one inch relative to the intersection of the bottom with the sides 16 and 18, and the front 12 and rear 14. However, the height of the dome can be increased or decreased as desired. The height of the dome can be varied based on the weight of the material and/or products to be maintained in the tray 10. In particular, the dome can be completely or partially flattened relative to the intersection of the bottom 20 and with the sides 16 and 18, and the front 12 and rear 14 in response to a weight of the cargo to be maintained by the tray 10. The height of the dome can be determined based on the projected flattening of the dome in response to weight of the cargo to be maintained by the tray 10.

Two or more trays can be stacked on top of one another in three different configurations. The height of two stacked trays in each configuration can be different. The trays can be blind stacked and unstacked. The engagement of two trays 10 and two trays 10a is substantially similar.

Figure 13:
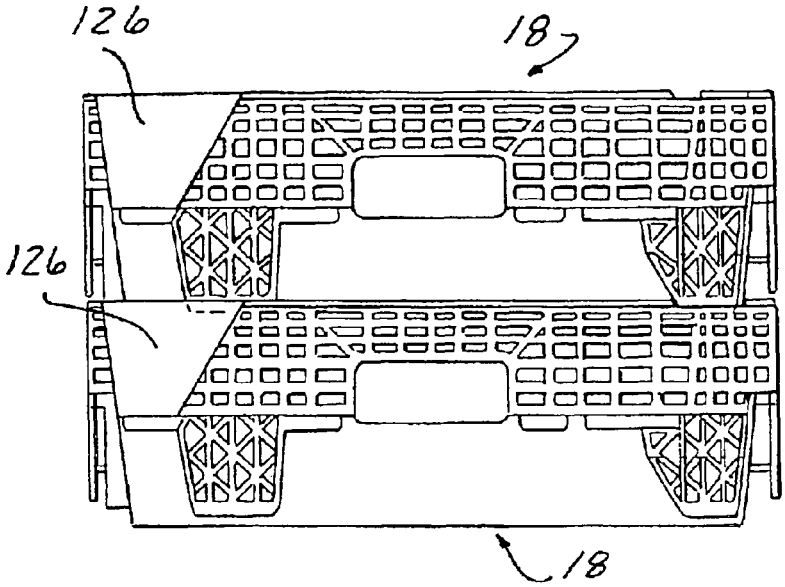
FIG. 13 is a side plan view of two trays according to the first embodiment of the invention stacked in a similar orientation with respect to one another.

In a first configuration, a bottom tray 10 and a top tray 10 are stacked in the same orientation, or at an angle of 0° relative to one another. In the first configuration, the second side 18 of the top tray engages the second side of the bottom tray. FIG. 10 is a front plan view of two trays stacked in the same orientation and FIG. 13 is a side plan view of two trays stacked in the same orientation. When two trays are stacked in a similar orientation, a foot 72a of a rear 14 of an upper tray is received by the notch 44 of the front 12 of a lower tray. The trays are moved relative to one another and a runner 134 of the upper tray enters the gain 46 of the front 12 of the lower tray and slides along the channel 158. An edge 184 of the rear foot 122 slidingly contacts surface 142 of the second side 18 of the lower tray. The runner 134 of the rear foot 122 engages the tapered rib 116 and moves past the rib 116 and ribs 114. The runner 132 of the top tray enters the gain 46 of the lower tray. The sliding motion of the top tray relative to the bottom tray stops when the runner 134 contacts or abuts the stop 160 of the lower tray. As shown in FIG. 10, when the upper tray is stacked relative to the lower tray in the same orientation, a beam 76 of the top tray contacts the support surface 50 of the boss 42 of the lower tray, the runner 132 of the upper tray engages the surface 152 of the lower tray, the runner 134 of the upper tray engages the surface 156 of the lower tray, and the edge 184 of the upper tray engages the surface 142 of the lower tray and the ribs 114 and 116. Substantially the same engagement occurs between the first side 16 of the top tray and the first side 16 of the lower tray.

Figure 12:
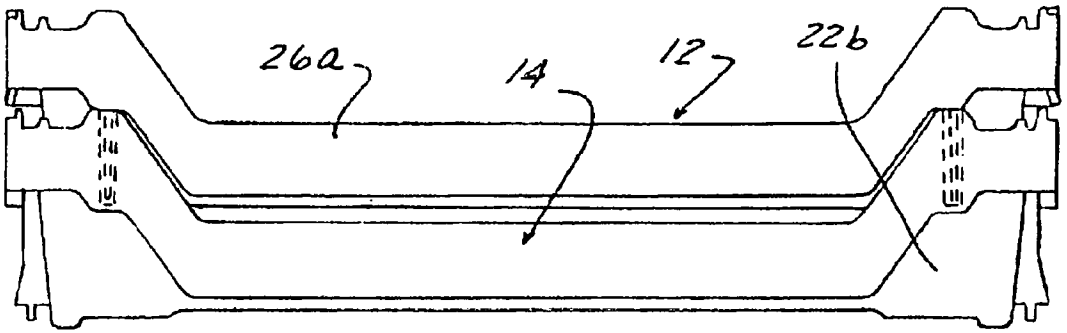
FIG. 12 is a rear plan view of two trays according to the first embodiment of the invention stacked at an angle of 180° relative to one another.
Figure 14:
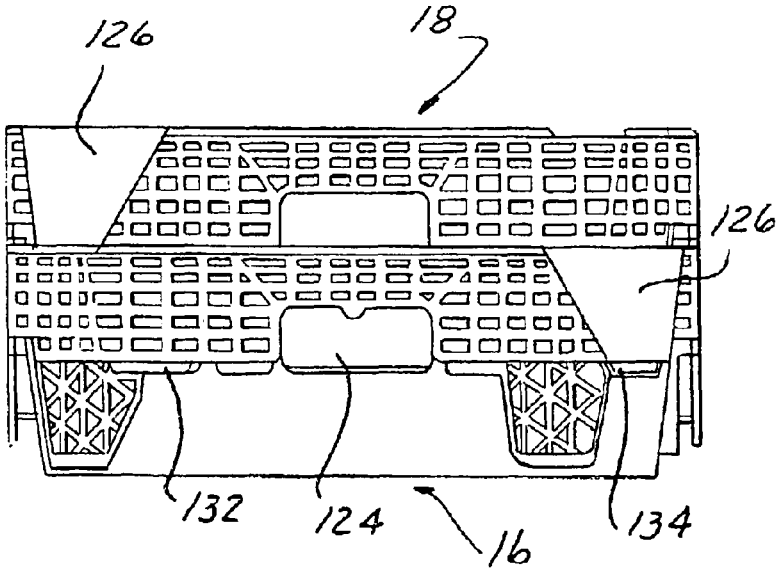
FIG. 14 is a side plan view of two trays according to the first embodiment of the invention stacked at an angle of 180° relative to one another.

In a second configuration, a bottom tray and a top tray are stacked in the opposite orientation, or at an angle of 180° relative to one another. In the second configuration, the first side 18 of the top tray engages the second side of the bottom tray. FIG. 12 is a front plan view of two trays stacked in the [same] *opposite* orientation and FIG. 14 is a side plan view of two trays stacked in the [same] *opposite* orientation. A foot 72 of the front 12 of the top tray enters the notch 44 of a lower tray. A runner 132 enters the gain 46 of the lower tray and slidingly contacts the surfaces 152 and 154 of the channel 158. A runner 134 enters the gain 46. When the front and rear feet 120 and 122 of the top tray are aligned with the rear and front pockets 92 and 90, respectively, of the bottom tray, the top tray drops into engagement with the bottom tray. The ribs 114 engage surface 136 to reduce the likelihood that the top tray will move relative to the bottom tray. When the top and bottom tray are engaged at an angle of 180° relative to one another, a beam 76 of the top tray is slidingly received in the channel 78 (shown in phantom in FIG. 12), runners 128 and 130 of the top tray contact surface 154 of the bottom tray, runner 132 of the top tray pierces the opening 112 of the bottom tray, runner 134 pierces the opening 110 of the bottom tray, and the bottom of the apron 26 of the top tray engages the top of the apron 26b of the rear 14 of the bottom tray. Substantially the same engagement occurs between the second side 18 of the top tray and the first side 16 of the lower tray.

Figure 11:
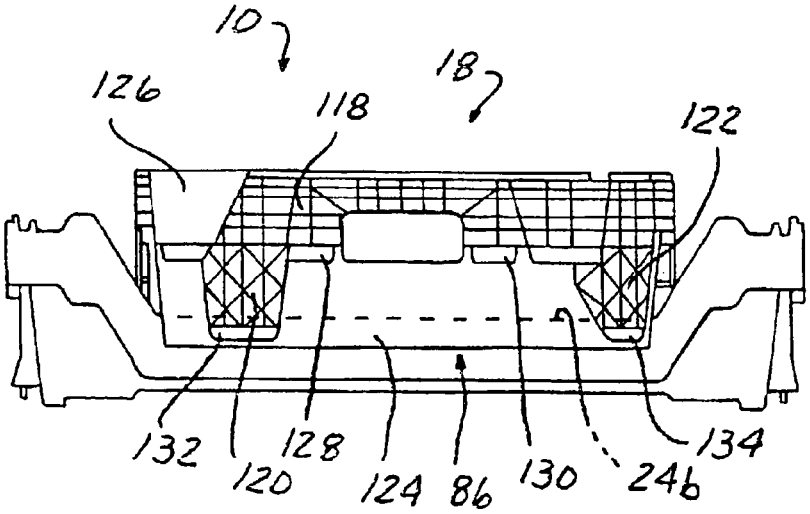
FIG. 11 is a rear plan view of two trays according to the first embodiment of the invention stacked at an angle of 90° relative to one another.

In a third configuration, a bottom tray and a top tray are stacked at an angle of 90° relative to one another. In the third configuration, the bottom 20 of the top tray engages the bottom surfaces 36 and 36d of the bottom tray. FIG. 11 is a rear plan view of two trays stacked at an angle of 90° relative to one another. The trays can be stacked so that a bottom edge of a wall 22 of a top tray engages the fillet 24 of the front 12 of a bottom tray and a fillet 24b of the rear 14 of the bottom tray. The shoulder 74 and a shoulder 74a of the front 12 of the top tray engage the aprons 26 and 26b and limit the movement of top tray relative to the bottom tray. Like shoulders can be formed in the rear 14 to engage the aprons 26 and 26b.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multi-purpose tray comprising:

a front wall having a front apron and a front channel defined by the front wall and the front apron;

a back wall spaced from the front wall and having a back apron and a back channel defined by the back wall and the back apron;

first and second sides each having an outer face and an inner face;

at least one foot extending from the outer face of one of the first and second sides, the at least one foot including a surface facing forward toward the front wall and adjoining the outer face and an outward facing surface adjoining the forward facing surface, the entire outward facing surface spaced away from and outboard of the outer face;

at least one pocket recessed into the inner face of a corresponding one of the first and second sides, the at least one pocket including a forward facing surface adjoining the inner surface and an inward facing surface adjoining the forward facing surface, the entire inward facing surface spaced away from and outboard of the inner face, where the at least one pocket is correspondingly shaped with respect to the at least one foot;

a bottom extending between the front wall and the back wall and between the first and second sides, where the front wall, back wall, first and second sides, and the bottom are integrally formed; and a plurality of ribs disposed along the inward facing surface of the at least one pocket, the ribs engageable with the outward facing surface of the at least one foot when two like trays are stacked in opposite directions rotated 180° with respect to one another.

2. The tray of claim 1 further comprising:

at least one drain aperture disposed along at least one of the front wall and back wall of the tray for communicating fluid from the channel.

3. The tray of claim 2 further comprising:

at least one rib disposed in the channel for defining, at least in part, the at least on aperture.

4. The tray of claim 3 wherein the rib is arcuate.

5. The tray of claim 3 wherein the rib is elongate.

6. The tray of claim 2 further comprising:

an opening defined by the at least one of the front wall and back wall and having a bottom surface and first and second side surfaces, the at least one aperture disposed in one of the bottom surface, the first side surface, and the second side surface.

7. The tray of claim 6 wherein the opening further comprises:

at least one secondary bottom surface adjoining one of the first and second side surfaces; and at least one secondary side surface adjoining the bottom surface and the at least one secondary bottom surface, the at least one aperture disposed in one of the at least one secondary bottom surface and the at least one secondary side surface.

8. The tray of claim 2 further comprising:

a notch defined by the at least one of the front wall and back wall, the at least one aperture disposed in the notch.

9. The tray of claim 1 further comprising:

a first handle disposed in the first side of the tray, the first handle having a first gripping portion;

a second handle disposed in a corresponding position in the second side of the tray, the second handle having a second gripping portion, wherein the first gripping portion has a different contour than the second gripping portion.

10. The tray of claim 1, wherein the plurality of ribs are operable to support a top tray during sliding movement of the top tray relative to a bottom tray during stacking of the top and bottom trays in the same direction relative to one another.

11. The tray of claim 1 wherein one of the ribs is tapered to enhance sliding movement of the top tray relative to the bottom tray during stacking.

12. The tray of claim 11 wherein the tapered rib is positioned closest to the center of the tray relative to the other ribs to minimize binding between the two trays being stacked relative to one another.

13. A multi-purpose tray comprising:

a front wall;

a back wall spaced from the front wall;

first and second sides each having an outer face and an upper edge;

a recessed channel longitudinally disposed along the upper edge of one of the first and second sides;

at least one foot extending from the outer face of one of the first and second sides, the at least one foot including a runner extending from a lower portion of the at least one foot, the runner slideably engageable with the recessed channel of a like tray when the two trays are stacked in the same direction with respect to one another;

a bottom extending between the front wall and the back wall and between the first and second sides, where the front wall, back wall, first and second sides, and the bottom are integrally formed; and a stop disposed within the recessed channel for limiting sliding movement of a top tray relative to a bottom tray in a first direction when the top and bottom trays are stacked relative to one another.

14. The tray of claim 13 wherein the stop comprises:

a ramp surface inclined to a bottom surface of the recessed channel, the ramp surface being engageable with the runner to permit sliding movement of one tray relative to the other in a second direction.

15. A multi-purpose tray comprising:

a front having a wall, an apron and a channel defined by the wall and the apron;

a back spaced from the front and having a second wall, a second apron and a second channel defined by the second wall and the second apron;

first and second sides each having an outer portion and inner portion, and at least one foot extending from the outer portion and at least one pocket defined by the inner portion where the at least one foot is correspondingly shaped with respect to the at least one [foot] *pocket*, each of the first and second sides operably associated with the front and the back;

a bottom extending along a first path between the front and the back and along a second path between the first and second sides, where the front, back, first and second sides, and the bottom are integrally formed;

at least one beam extending from the front of the tray; and at least one slot formed in the back of the tray to receive the beam when two trays are stacked in opposite directions with respect to one another.

16. The multi-purpose tray of claim 15, wherein the beam adjoins the front apron.

17. A multi-purpose tray comprising:

a front having a wall, an apron and a channel defined by the wall and the apron;

a back spaced from the front and having a second wall, a second apron and a second channel defined by the second wall and the second apron;

first and second sides each having an outer portion and inner portion, and at least one foot extending from the outer portion and at least one pocket defined by the inner portion where the at least one foot is correspondingly shaped with respect to the at least one pocket, each of the first and second sides operably associated with the front and the back; and a bottom extending along a first path between the front and the back and along a second path between the first and second sides, where the front, back, first and second sides, and the bottom are integrally formed, and wherein one of the first and second paths is arcuate at least in part, wherein the bottom comprises at least one transverse rib extending from the first side to the second side and aligned substantially perpendicular to at least one of the first and second sides.

18. The tray of claim 17 wherein the first and second paths are arcuate.

19. A multi-purpose tray comprising:

a front having a wall, an apron and a channel defined by the wall and the apron;

a back spaced from the front and having a second wall, a second apron and a second channel defined by the second wall and the second apron;

first and second sides each having an outer portion and inner portion, and at least one foot extending from the outer portion and at least one pocket defined by the inner portion where the at least one foot is correspondingly shaped with respect to the at least one pocket, each of the first and second sides operably associated with the front and the back; and a bottom extending along a first path between the front and the back and along a second path between the first and second sides, where the front, back, first and second sides, and the bottom are integrally formed, and wherein one of the first and second paths is arcuate at least in part, wherein the bottom comprises at least one longitudinal rib extending from the front wall to the second wall and aligned substantially perpendicular to at least one of the front and second walls.

*20. A multi-purpose tray comprising:*

*a front wall;*

*a back wall spaced from the front wall;*

*first and second sides each having an outer face and an inner face;*

*at least one foot extending from the outer face of one of the first and second sides, the at least one foot including a surface facing forward toward the front wall and adjoining the outer face and an outward facing surface adjoining the forward facing surface, the entire outward facing surface spaced away from and outboard of the outer face;*

*at least one pocket recessed into the inner face of a corresponding one of the first and second sides, the at least one pocket including a forward facing surface adjoining the inner face and an inward facing surface adjoining the forward facing surface, the entire inward facing surface spaced away from and outboard of the inner face, where the at least one pocket is correspondingly shaped with respect to the at least one foot;*

*a bottom extending between the front wall and the back wall and between the first and second sides, where the front wall, back wall, first and second sides, and the bottom are integrally formed; and*

*a plurality of ribs disposed along the inward facing surface of the at least one pocket, the ribs engageable with the outward facing surface of the at least one foot when two like trays are stacked in opposite directions rotated 180° with respect to one another.*

*21. A tray according to claim 20 further comprising:*

*a first handle disposed in the first side of the tray, the first handle having a first gripping portion; and*

*a second handle disposed in a corresponding position in the second side of the tray, the second handle having a second gripping portion, wherein the first gripping portion has a different contour than the second gripping portion.*

*22. A tray according to claim 20 wherein the plurality of ribs are operable to support a top tray during sliding movement of the top tray relative to a bottom tray during stacking of the top and bottom trays in the same direction relative to one another.*

*23. A tray according to claim 20 wherein one of the ribs is tapered to enhance sliding movement of the top tray relative to the bottom tray during stacking.*

*24. A tray according to claim 23 wherein the tapered rib is positioned closest to the center of the tray relative to the other ribs to minimize binding between the two trays being stacked relative to one another.*

*25. A multi-purpose tray comprising:*

*a front wall:*

*a back wall spaced from the front wall;*

*first and second sides each having an outer face and an upper edge;*

*a channel longitudinally disposed along the upper edge of one of the first and second sides;*

*at least one foot extending from the outer face of one of the first and second sides, the at least one foot including a*

*runner extending from a lower portion of the at least one foot, the runner slidably engageable with the channel of a like tray when the two trays are stacked in the same direction with respect to one another;*

*a bottom extending between the front wall and the back wall and between the first and second sides, where the front wall, back wall, first and second sides and the bottom are integrally formed; and*

*a stop associated with the channel for limiting sliding movement of a top tray relative to a bottom tray in a first direction when the top and bottom trays are stacked relative to one another.*

*26. A tray according to claim 25 wherein the stop comprises a ramp surface inclined to a bottom surface of the channel, the ramp surface being engageable with the runner to permit sliding movement of one tray relative to the other in a second direction.*

*27. A multi purpose tray comprising a front, back, first and second sides, and a bottom integrally formed with the front, back and sides, each side having at least one downwardly extending foot and one upwardly opening pocket offset with respect to the foot, the pocket of the first side configured to receive the foot of the second side and the pocket of the second side configured to receive the foot of the first side, the feet and pockets being configured and relatively disposed such that with two trays stacked in the same direction the trays are vertically spaced with the feet of the upper tray supported on upper edges of the lower tray and with two trays stacked in opposite directions the trays are nested with the foot of the first side of the upper tray nested in the pocket of the second side of the lower tray and the foot of the second side of the upper tray nested in the pocket of the first side of the lower tray, characterized in that:*

*the tray further includes at least one vertical beam extending from the front of the tray and at least one vertical slot formed in the back of the tray and configured to receive the beam; and*

*with the two trays stacked in the same direction, the beam of the upper tray is supported on an upper edge of the lower tray and with the two trays stacked in opposite directions the beam of the upper tray is positioned in the slot of the lower tray.*

*28. A multi-purpose tray according to claim 27 wherein each side has at least two spaced feet and at least two spaced upwardly opening pockets.*

*29. A multi-purpose tray according to claim 27 wherein:*

*each front has at least two spaced beams; and*

*each back has at least two spaced slots.*

*30. A multi-purpose tray comprising:*

*a front;*

*a back;*

*first and second sides each defining a plurality of downwardly extending feet and each defining a plurality of upwardly opening pockets to receive the feet when two trays are stacked in opposite directions with respect to one another;*

*a bottom integrally formed with the front, back and first and second sides;*

*at least one beam extending from the front of the tray; and*

*at least one slot formed in the back of the tray to receive the beam when two trays are stacked in opposite directions with respect to one another.*

*31. A multi-purpose tray comprising:*

*a front;*

*a back;*

*first and second sides;*

*a bottom extending along a first path between the front and the back and along a second path between the first and second sides, where the front, back, first and second sides and the bottom are integrally formed and wherein one of the first and second paths is arcuate at least in part; and*

*wherein the bottom comprises at least one transverse rib extending from the first side to the second side and aligned substantially perpendicular to at least one of the first and second sides.*

*32. A tray according to claim 31 wherein the first and second paths are arcuate.*

*33. A multi-purpose tray comprising:*

*a front;*

*a back;*

*first and second sides; and*

*a bottom extending along a first path between the front and back and along a second path between the first and second sides, where the front, back, first and second sides and the bottom are integrally formed and wherein one of the first and second paths is arcuate at least in part;*

*wherein the bottom comprises at least one longitudinal rib extending from the front to the back and aligned substantially perpendicular to at least one of the front and back.*

* * * * *

UNITED STATES PATENT AND TRADEMARK OFFICE

CERTIFICATE OF CORRECTION

PATENT NO. : RE44,754 E
APPLICATION NO. : 11/508114
DATED : February 11, 2014
INVENTOR(S) : Donald Verna et al.

It is certified that error appears in the above-identified patent and that said Letters Patent is hereby corrected as shown below:

On the Title Page:

Item (75) Inventors, delete "Forth Worth" and insert --Fort Worth-- therefor;

In the Specification:

Column 1, line 65, delete "the of" before "stacking" and insert --of the-- therefor;

In the Claims:

Column 12, line 60, in Claim 25, delete "wall:" and insert --wall;-- therefor;

Column 13, line 18, in Claim 27, delete "multi purpose" and insert --multi-purpose-- therefor.

Signed and Sealed this
Third Day of June, 2014

Michelle K. Lee

Michelle K. Lee
*Deputy Director of the United States Patent and Trademark Office*